(12) United States Patent
Fitch et al.

(10) Patent No.: US 12,250,569 B2
(45) Date of Patent: Mar. 11, 2025

(54) CELLULAR TELECOMMUNICATIONS NETWORK

(71) Applicant: BRITISH TELECOMMUNICATIOSN PUBLIC LIMITED COMPANY, London (GB)

(72) Inventors: Michael Fitch, London (GB); Richard Mackenzie, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 17/250,120

(22) PCT Filed: Apr. 8, 2019

(86) PCT No.: PCT/EP2019/058779
§ 371 (c)(1),
(2) Date: Dec. 1, 2020

(87) PCT Pub. No.: WO2019/228695
PCT Pub. Date: Dec. 5, 2019

(65) Prior Publication Data
US 2021/0235289 A1 Jul. 29, 2021

(30) Foreign Application Priority Data
Jun. 1, 2018 (EP) .................................... 18175593

(51) Int. Cl.
*H04W 24/02* (2009.01)
*H04W 16/10* (2009.01)
(Continued)

(52) U.S. Cl.
CPC ........... *H04W 24/02* (2013.01); *H04W 16/10* (2013.01); *H04W 24/08* (2013.01); *H04W 72/542* (2023.01)

(58) Field of Classification Search
CPC ..... H04W 24/02; H04W 24/08; H04W 16/10; H04W 72/085; H04W 72/0486
See application file for complete search history.

(56) References Cited

U.S. PATENT DOCUMENTS 8,099,487 B1 * 1/2012 Smirnov ............... G06F 9/5088
718/1
9,191,327 B2 * 11/2015 Shieh ...................... H04L 67/60
(Continued)

FOREIGN PATENT DOCUMENTS

CN 104660394 A 5/2015
CN 107637111 A 1/2018
(Continued)

OTHER PUBLICATIONS

Office Action for Korean Application No. 10-2020-7033682, mailed Mar. 25, 2022, 8 pages.
(Continued)

*Primary Examiner* — Meng Vang
*Assistant Examiner* — Hector Reyes
(74) *Attorney, Agent, or Firm* — EIP US LLP

(57) ABSTRACT

This disclosure relates to a method of allocating a resource in a virtualized radio access network, wherein the virtualized radio access network includes a first virtual machine delivering a first service type and a second virtual machine delivering a second service type.

11 Claims, 5 Drawing Sheets

(51) Int. Cl.
*H04W 24/08* (2009.01)
*H04W 72/542* (2023.01)

(56) References Cited

U.S. PATENT DOCUMENTS

| | | | | |
|---|---|---|---|---|
| 10,824,454 | B2* | 11/2020 | Shaw | H04L 41/0896 |
| 10,965,558 | B2* | 3/2021 | Jayakumar | H04L 41/14 |
| 11,533,777 | B2* | 12/2022 | Pennington | H03M 1/001 |
| 2016/0353367 | A1 | 12/2016 | Vrzic et al. | |
| 2017/0104609 | A1 | 4/2017 | Mcnamee et al. | |
| 2017/0141973 | A1* | 5/2017 | Vrzic | H04W 76/11 |
| 2017/0164349 | A1 | 6/2017 | Zhu et al. | |
| 2017/0310437 | A1 | 10/2017 | Bottari et al. | |
| 2017/0318468 | A1* | 11/2017 | Aijaz | H04W 72/0433 |
| 2017/0357528 | A1* | 12/2017 | Puranik | H04L 49/70 |
| 2017/0367081 | A1* | 12/2017 | Cui | H04L 41/0816 |
| 2018/0013680 | A1* | 1/2018 | Bull | H04W 72/1268 |
| 2018/0152958 | A1* | 5/2018 | Arnold | H04L 41/5009 |
| 2019/0014504 | A1* | 1/2019 | Shimojou | H04W 24/02 |
| 2019/0109768 | A1* | 4/2019 | Senarath | H04W 48/16 |
| 2020/0053531 | A1* | 2/2020 | Myhre | H04W 60/04 |

FOREIGN PATENT DOCUMENTS

| | | | |
|---|---|---|---|
| EP | 3195644 | A1 | 7/2017 |
| EP | 3327990 | A1 | 5/2018 |
| GB | 2553077 | A | 2/2018 |
| JP | 2011530235 | A | 12/2011 |
| JP | 2013-544039 | | 12/2013 |
| JP | 2017-200172 | | 11/2017 |
| KR | 20180039567 | A | 4/2018 |
| WO | WO-2016041595 | A1 | 3/2016 |
| WO | WO-2016192636 | A1 | 12/2016 |
| WO | WO-2017097169 | A1 | 6/2017 |

OTHER PUBLICATIONS

Communication pursuant to Article 94(3) EPC for European Application No. 19714690.5, mailed on Mar. 17, 2023, 10 pages.
Office Action received for Chinese Patent Application No. 201980035957.0, mailed on Aug. 4, 2023, 10 Pages (English Translation Only).
Caiming R., et al., "Cognitive Radio Communication and Networking: Principles and Practice," Chapter 11, 46 Pages.
Etkin R., et al., "Spectrum Sharing for Unlicensed Bands," Dept. of Electrical Engineering and Computer Sciences, 31 pages.
Examination Report for Great Britain Application No. 1809017.5 mailed on Oct. 1, 2020, 3 pages.
Examination Report for Great Britain Application No. 1809017.5 mailed on Jul. 23, 2020, 3 pages.
Extended European Search Report for Application No. 18175593.5, mailed on Nov. 7, 2018, 8 pages.
GB Combined Search and Examination Report for GB Application No. GB1809017.5 mailed Nov. 1, 2018, 5 pages.
International Preliminary Report on Patentability for Application No. PCT/EP2019/058779, mailed on Jun. 15, 2020, 17 pages.
International Search Report and Written Opinion for PCT Application No. PCT/EP2019/058779 mailed on Apr. 24, 2019, 10 pages.
Natarajan M., "Cognitive Radio Technology Applications for Wireless and Mobile Ad Hoc Networks," 14 pages.
Office Action For Korean Application No. 10-2020-7033682, mailed on Aug. 11, 2021, 5 pages.
Written Opinion for PCT Application No. PCT/EP2019/058779 mailed on Apr. 15, 2020, 7 pages.
First Office Action for Japan Application No. 2020-566889 mailed Jan. 25, 2022, pp. 1-3.

* cited by examiner

CELLULAR TELECOMMUNICATIONS NETWORK

PRIORITY CLAIM

The present application is a National Phase entry of PCT Application No. PCT/EP2019/058779, filed Apr. 8, 2019, which claims priority from EP Patent Application No. 18175593.5, filed Jun. 1, 2018, each of which is hereby fully incorporated herein by reference.

TECHNICAL FIELD

The present disclosure relates to a cellular telecommunications network.

BACKGROUND

A conventional cellular telecommunications network uses dedicated hardware components that performed specific tasks. This gave network operators fine control over its infrastructure such that it could be carefully planned and deployed. However, this was also inflexible such that all parts of the infrastructure served all forms of applications (e.g. voice, file transfer, Device-to-Device communications), rather than be tailored for providing the optimal configuration for a particular application. Furthermore, components of new generations of cellular networks were typically not backwards compatible with previous generations. To address these issues, a technique called network slicing was introduced to cellular networks.

Network slicing introduces virtualized networking infrastructure such that the functions of each hardware component of the cellular network may be run on general computing hardware (e.g. servers). This may be performed for each node in the cellular network, including the radio access network, edge network and core network. In doing so, a virtual network "slice" may be established which utilizes virtual machines established on one or more nodes in the cellular network, wherein the network slice may be optimized for a particular application or to be backwards compatible with a particular technology.

For edge and core networking nodes and their respective links, a network operator may plan and deploy suitable general computing hardware to serve the expected traffic for all network slices. Furthermore, the network operator may readily upgrade the general computing hardware for these edge and core networking nodes to account for expected future traffic for all network slices. For radio access networking nodes, a network operator may plan their usage of radio spectrum across the various network slices (i.e. to allocate a first portion of radio spectrum to a first network slice and a second portion of radio spectrum to a second network slice). However, it may not be possible (e.g. due to regulatory constraints) to simply increase the amount of radio spectrum if the demands of the network slices increase. It is therefore important to allocate resources, particularly radio spectrum, between network slices carefully.

SUMMARY

According to a first aspect of the disclosure, there is provided a method of allocating a resource in a virtualized radio access network, wherein the virtualized radio access network includes a first virtual machine delivering a first service type and a second virtual machine delivering a second service type, the method comprising: receiving data indicating a performance measure of a first parameter for the first virtual machine and further indicating a performance measure of the first parameter for the second virtual machine; determining a first spectrum utilization for the first virtual machine based on the performance measure of the first parameter for the first virtual machine relative to a performance requirement for the first parameter; determining a second spectrum utilization for the second virtual machine based on the performance measure of the first parameter for the second virtual machine relative to the performance requirement for the first parameter; comparing the first spectrum utilization to a target spectrum utilization for the first service type; comparing the second spectrum utilization to a target spectrum utilization for the second service type; and configuring a resource allocation for the first and/or second virtual machine based on the comparisons of the first and second spectrum utilizations to their respective target spectrum utilizations.

The data may indicate a performance measure of a second parameter for the first virtual machine and further indicates a performance measure of the second parameter for the second virtual machine, the first spectrum utilization for the first virtual machine may be further based on the performance measure of the second parameter for the first virtual machine relative to a performance requirement for the second parameter, and the second spectrum utilization for the second virtual machine may be further based on the performance measure of the second parameter for the second virtual machine relative to the performance requirement for the second parameter.

The first spectrum utilization for the first virtual machine may be based on a product or sum of (i) the performance measure of the first parameter for the first virtual machine relative to the performance requirement for the first parameter, and (ii) the performance measure of the second parameter for the first virtual machine relative to the performance requirement for the second parameter, and the second spectrum utilization for the second virtual machine may be based on a product or sum of (i) the performance measure of the first parameter for the second virtual machine relative to the performance requirement for the first parameter, and (ii) the performance measure of the second parameter for the second virtual machine relative to the performance requirement for the second parameter.

The performance measure of the first parameter may be one of a set of performance measures of the first parameter, each relating to a UE of a plurality of UEs, and the performance measure of the second parameter is one of a set of performance measures of the second parameter, each relating to a UE of the plurality of UEs, the first spectrum utilization for the first virtual machine may be based on a sum of the product of (i) each performance measure of the first parameter for each UE for the first virtual machine relative to the performance requirement for the first parameter, and (ii) each performance measure of the second parameter for each UE for the first virtual machine relative to the performance requirement for the second parameter, and the second spectrum utilization for the second virtual machine may be based on a sum of the product of (i) each performance measure of the first parameter for each UE for the second virtual machine relative to the performance requirement for the first parameter, and (ii) each performance measure of the second parameter for each UE for the second virtual machine relative to the performance requirement for the second parameter.

The first and/or second spectrum utilizations may be further based on one or more of the following: cost of serving the UE, bandwidth, and coverage area.

Configuring the resource allocation may include one or more of the following: adjusting frame time, reallocating resource blocks, and reallocating processing resources.

The first virtual machine may be one of a plurality of first virtual machines, each being deployed on a respective networking node, for delivering the first service type, and the second virtual machine may be one of a plurality of second virtual machines, each being deployed on a respective networking node, for delivering the second service type.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a network node for a virtualized radio access network, wherein the virtualized radio access network includes a first virtual machine delivering a first service type and a second virtual machine delivering a second service type, the network node comprising: a receiver adapted to receive data indicating a performance measure of a first parameter for the first virtual machine and further indicating a performance measure of the first parameter for the second virtual machine; and a processor adapted to: determine a first spectrum utilization for the first virtual machine based on the performance measure of the first parameter for the first virtual machine relative to a performance requirement for the first parameter; determine a second spectrum utilization for the second virtual machine based on the performance measure of the first parameter for the second virtual machine relative to the performance requirement for the first parameter; compare the first spectrum utilization to a target spectrum utilization for the first service type; compare the second spectrum utilization to a target spectrum utilization for the second service type; and configure a resource allocation for the first and/or second virtual machine based on the comparisons of the first and second spectrum utilizations to their respective target spectrum utilizations.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
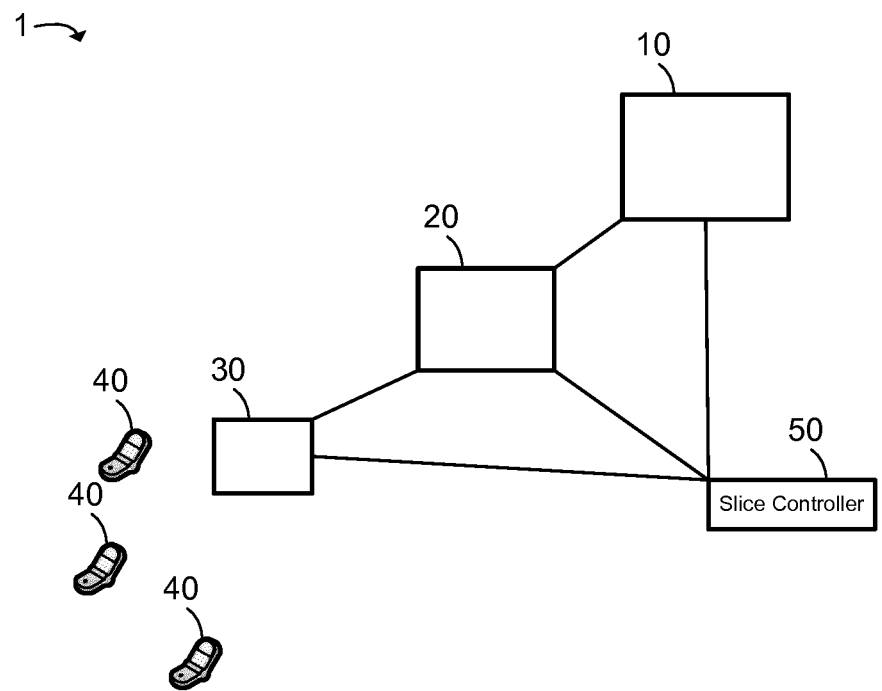
FIG. 1 is a schematic diagram illustrating a first embodiment of a cellular telecommunications network of the present disclosure.

A first embodiment of a cellular telecommunications network 1 will now be described with reference to FIGS. 1 to 4. As shown in FIG. 1, the cellular telecommunications network includes a core networking node 10, an edge networking node 20, an access networking node 30, a plurality of UEs 40 and a slice controller 50. There may be many other core, edge and access networking nodes in the cellular network 1 (wherein there are typically more edge networking nodes than core networking nodes, and there are typically more access networking nodes than edge networking nodes), but only one of each is shown for simplicity. In this embodiment, the core, edge and access networking nodes are each implemented by a server.

Figure 2:
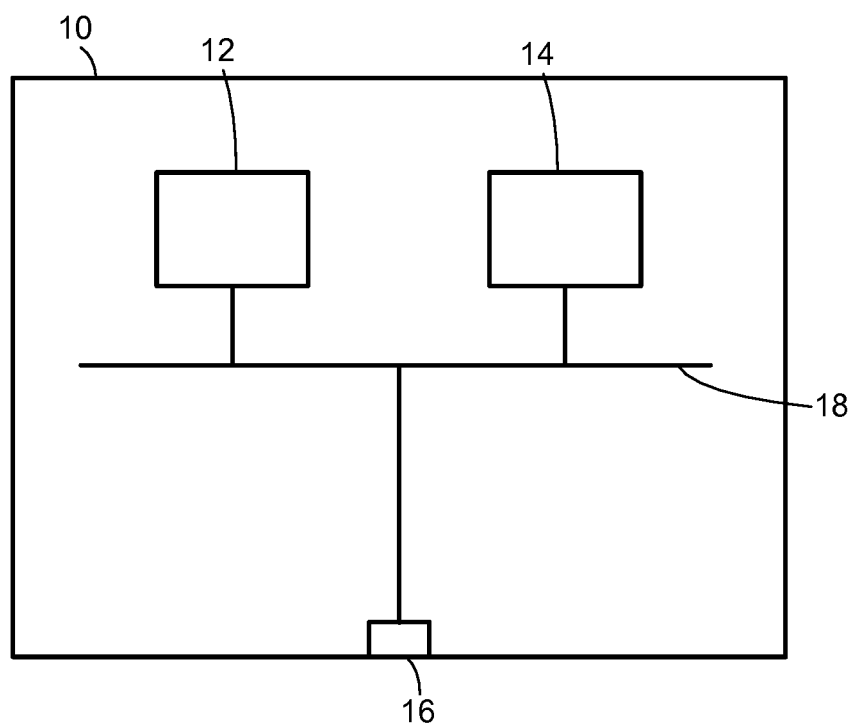
FIG. 2 is a schematic diagram of a server of the network of FIG. 1.

A schematic diagram of a server for a core networking node 10 is shown in FIG. 2. The server includes a central processor unit (CPU) 12 communicatively connected to storage 14 and an input/output (I/O) interface 16 via a data bus 18. Storage 14 can be any read/write storage device such as a random access memory (RAM) or a non-volatile storage device. An example of a non-volatile storage device includes a disk or tape storage device. The I/O interface 16 is an interface to devices for the input or output of data, or for both input and output of data. In this embodiment, the I/O device is a network connection (for connection, for example, to one or more other core networking nodes or one or more edge networking nodes), but may also include a keyboard, a mouse, or a display (such as a monitor). The CPU 12, storage 14, I/O interface 16 and data bus 18 cooperate to define a Software Defined Network (SDN) operating environment in which any networking function of a core networking node (e.g. packet data network gateways, User Plane Function (UPF), Control Plane Function (CPF), etc.) may be implemented as software. In this manner, the server may be configured to operate as any one of the core networking nodes by using the corresponding software. Furthermore, the server is configured to implement a Network Function Virtualization (NFV) architecture such that the server may implement a plurality of virtual machines, wherein each virtual machine may provide a different SDN operating environment implementing a particular networking function that is optimized for a particular service type. For example, the server may implement a first virtual machine being configured to implement a particular networking function that is optimized for a first service type (e.g. Device-to-Device (D2D) communications) and a second virtual machine being configured to implement the same networking function but optimized for a second service type (e.g. virtual reality application).

The edge and access networking nodes are substantially similar to the server illustrated in FIG. 2, such that they may also implement SDN operating environments and NFV architectures. Examples of networking functions of an edge networking node that may be implemented in any one virtual machine of a server include a Multi-Access Edge Computer (MEC) platform and UPF; and examples of networking functions of an access networking node that may be implemented in any one virtual machine of a server include Radio Access Network (RAN) Centralized Unit (CU) or Remote Unit (RU) processing.

Figure 3:
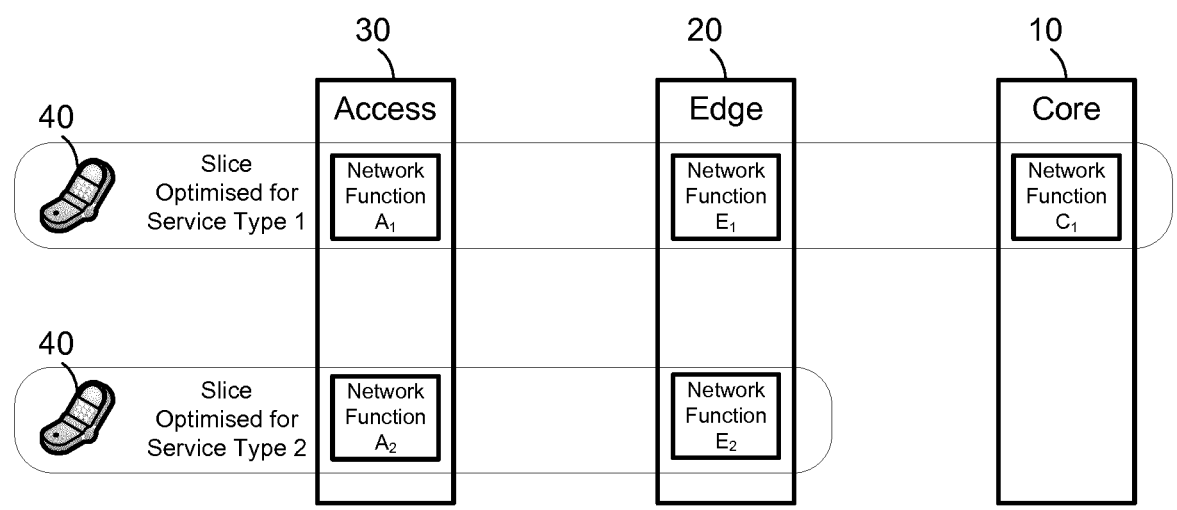
FIG. 3 is a schematic diagram illustrating a first and second network slice across several nodes of the network of FIG. 1.

Furthermore, it is possible to establish a plurality of virtual machines across several networking nodes (e.g. across a combination of core, edge and/or access networking nodes) which cooperate to implement a virtual cellular network. This is often referred to as a "network slice". FIG. 3 is a schematic diagram of the cellular network 1, illustrating a first and second network slice being implemented by several core, edge and/or access networking nodes. Each slice is for delivering a particular service type to one or more UEs of the plurality of UEs and each virtual machine of the network slice is configured to provide a particular networking function which is optimized for that service type. In this example, the first network slice is for delivering a D2D service, such that the network slice is configured to serve the UE with relatively high bit-rate, relatively low bit-rate communications, and the second network slice is for delivering a virtual reality service, such that the second network slice is configured to serve the UE with relatively low latency, relatively high bit-rate communications.

Figure 4:
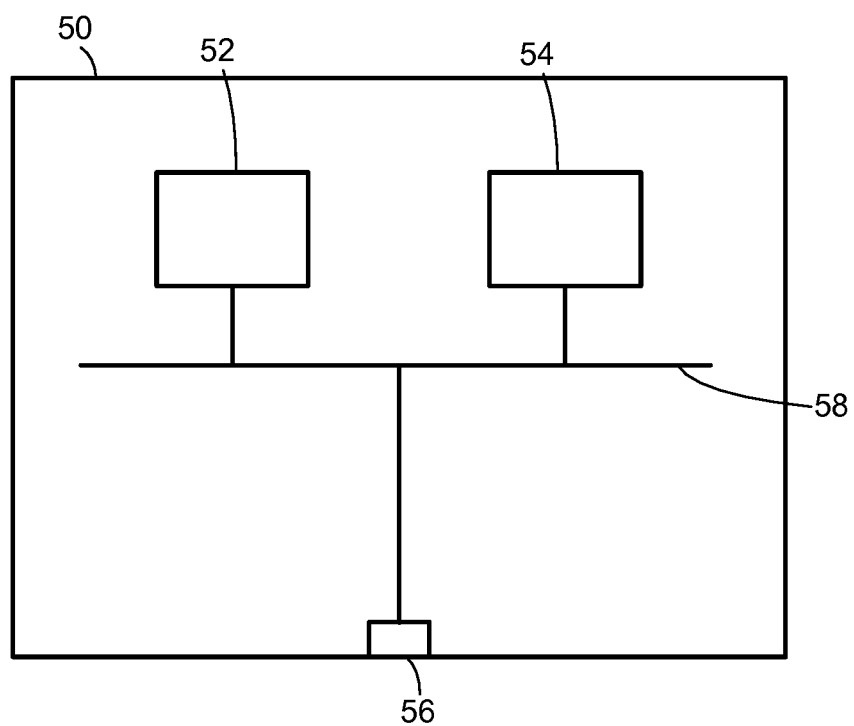
FIG. 4 is a schematic diagram of a slice controller of the network of FIG. 1.

As noted above, the cellular network further includes a slice controller 50. The slice controller 50 is shown in FIG. 4, and includes a CPU 52, storage 54, I/O interface 56 (connected via a bus 58). Storage 54 includes a first database storing data for all forms of service types that the cellular network supports, such as voice, virtual reality, D2D, autonomous vehicles, file transfer, etc. In this embodiment, this data includes, for each service type, a target Spectrum Utility (SU) metric and a threshold SU metric. Furthermore, storage 54 includes a second database having a table identifying a requirement for each service type. The following tables illustrate this data:

TABLE 1

Table illustrating data stored in the first database in the slice controller 50

| Service Type | Target SU | Threshold SU |
|---|---|---|
| D2D (ID = 1) | $SU_1^{Target}$ | $SU_1^{Thresh}$ |
| Virtual Reality (ID = 2) | $SU_2^{Target}$ | $SU_2^{Thresh}$ |
| ... | ... | ... |

TABLE 2

Table illustrating data stored in the second database in the slice controller 50

| Service Type | Mean Bit-Rate (ID = 1) | Latency (ID = 2) | ... |
|---|---|---|---|
| D2D (ID = 1) | $Req_1^1$ | $Req_1^2$ | ... |
| Virtual Reality (ID = 2) | $Req_2^1$ | $Req_2^2$ | ... |
| ... | ... | ... | ... |

In this embodiment, the second database includes the requirements for each service type which applies to all UEs. However, in enhanced embodiments, the second database may include separate tables for each UE or a particular subset of UEs in the cellular network, such that the requirements for each UE or each subset of UEs may be distinct.

Storage 54 of the slice controller 50 also includes a third database storing data relating to a plurality of policies for slice management in the cellular network 1. The purpose of these databases will become clear upon review of the embodiment of the method of the disclosure, which will now be described with reference to FIG. 5.

In the example, a first subset of UEs of the plurality of UEs use the first network slice for a D2D service. Each instance of a UE of the first subset of UEs using the first network slice for the D2D service is called an "application" on the first network slice. Furthermore, a second subset of UEs of the plurality of UEs use the second network slice for a virtual reality service. Again, each instance of a UE of the second subset of UEs using the second network slice for the virtual reality service is called an application on the second network slice. It is noted that a single UE may be a member of both the first and second subset of UEs if that UE instantiates applications on the first and second network slices (for D2D and virtual reality services respectively).

In S1 of the method, each UE of the first and second subsets of UEs performs measurements on one or more parameters in order to produce a measurement report. These may include, for example, mean bit-rate, latency, jitter, and error rate. Each UE of the first and second subsets of UEs sends their respective measurement reports to their respective access networking nodes.

In S3, the access networking node(s) forward this data to the slice controller 50. In S5, the CPU 52 of the slice controller 50 processes this data to determine a Satisfaction Level (SL) for each application. This is achieved by retrieving data from its second database identifying the requirements for each parameter for the particular service type (and, in enhanced embodiments, for that particular UE), and implementing the following first function:

$$SL(k, l) = \frac{\left(\frac{R_l^k}{Req_l^k}\right)^\epsilon}{1 + \left(\frac{R_l^k}{Req_l^k}\right)^\epsilon}$$

In this first function, the CPU 52 calculates, for each application (l) and each requirement (k), a ratio (normalized to a number between 0 and 1) of the measurement (R) for a particular parameter (e.g. mean bit rate) compared to the stored requirement (Req) for that particular parameter. Integer ε is an operator defined weighting that may be used to make some parameters more influential than others.

The CPU 52 then implements a second function:

$$SL(l) = \Pi_{k=1}^{K} SL(k,l)^{\alpha_k}; \alpha_k > 1$$

In this second function, the CPU 52 calculates an SL for each application by multiplying the SL for each requirement for a particular application. Integer α is also an operator defined weighting that may be used to make some parameters more influential than others.

The slice controller 50 therefore determines an SL indicating a performance of the first network slice at delivering the first service type to each application (i.e. each UE of the first subset of UEs) and a performance of the second network slice at delivering the second service type to each application (i.e. each UE of the second subset of UEs). This performance measure takes into account each parameter type, which may be weighted by the operator.

In S7, the slice controller 50 calculates an SU (that is, Spectrum Utility) for each network slice by summing the SLs (calculated in S5 for each application) across all applications. In this embodiment, the SU further takes into account the value of that service to each application (i.e. to the end user of that application), the cost of delivering that service to each application, and the bandwidth used in delivering that service. The cost is derivable from the measurement report (e.g. the mean bit rate may be converted into a cost by translating the mean bit rate into a resource usage and multiplying that by a unit cost for that resource). The CPU 52 of the slice controller 50 calculates the SU for the first and second network slices based on the following third function:

$$SU = \frac{1}{B}\sum_{l=1}^{L} SL(l) \cdot v(l)/c(l)$$

In the above third function, integer B is the bandwidth of the radio spectrum used by the network slice, v is the value of that service to each application, and c is the cost of delivering that service for each application. The third function therefore sums ratios of the product of the SL for each application and its value to the end user against the cost of delivering the service to each application across all applications in a network slice.

The slice controller 50 therefore determines an SU indicating a performance of all applications across a network slice relative to the bandwidth used by that network slice. This performance metric may be used by the slice controller 50 to identify if resources in the network should be reallocated and, if so, how those resources should be reallocated. Accordingly, in S9, CPU 52 controller retrieves the threshold and target SUs for the D2D and virtual reality service types (as the first and second network slices relate to these service types). CPU 52 then compares the SU for the first network slice to the threshold SU and target SU for D2D communications, and compares the SU for the second network slice to the threshold SU and target SU for virtual reality.

In S11, the CPU 52 retrieves policies from the third database to identify a suitable course of action following the comparison of the SUs for the first and second network slices to the relevant target and threshold SUs. In this embodiment, the policies are:

If the SUs for the first and second network slices are both above the target SUs, then no action is taken.

If the SU for the first network slice is below its respective target SU, and the SU for the second network slice is above its respective target SU, then a resource of the cellular network is reallocated from the second network slice to the first network slice;

If the SU for the second network slice is below its respective target SU, and the SU for the first network slice is above its respective target SU, then a resource of the cellular network is reallocated from the first network slice to the second network slice; and If the SUs for both the first and second network slices are below their respective target SUs, then a resource of the cellular network is reallocated from the network slice having the greater SU to the other network slice.

Following S11, the method loops back to S1 (via a delay timer). The above process therefore has the effect of providing more resources to network slices that are not satisfactorily serving all their respective UEs to the requirements of the service type being delivered by that network slice. These resources are reallocated from network slices that are satisfactorily serving all their respective UEs (or, at least performing better at serving all their respective UEs). The SU metric is therefore a network slice level performance measure that is used to equitably reallocate resources. In this embodiment, these resources relate to those used by access networking nodes in the cellular network, such as resource blocks allocated to each network slice, transmit time allocated to each network slice, allocation of processing power to each network slice, etc.

Figure 5:
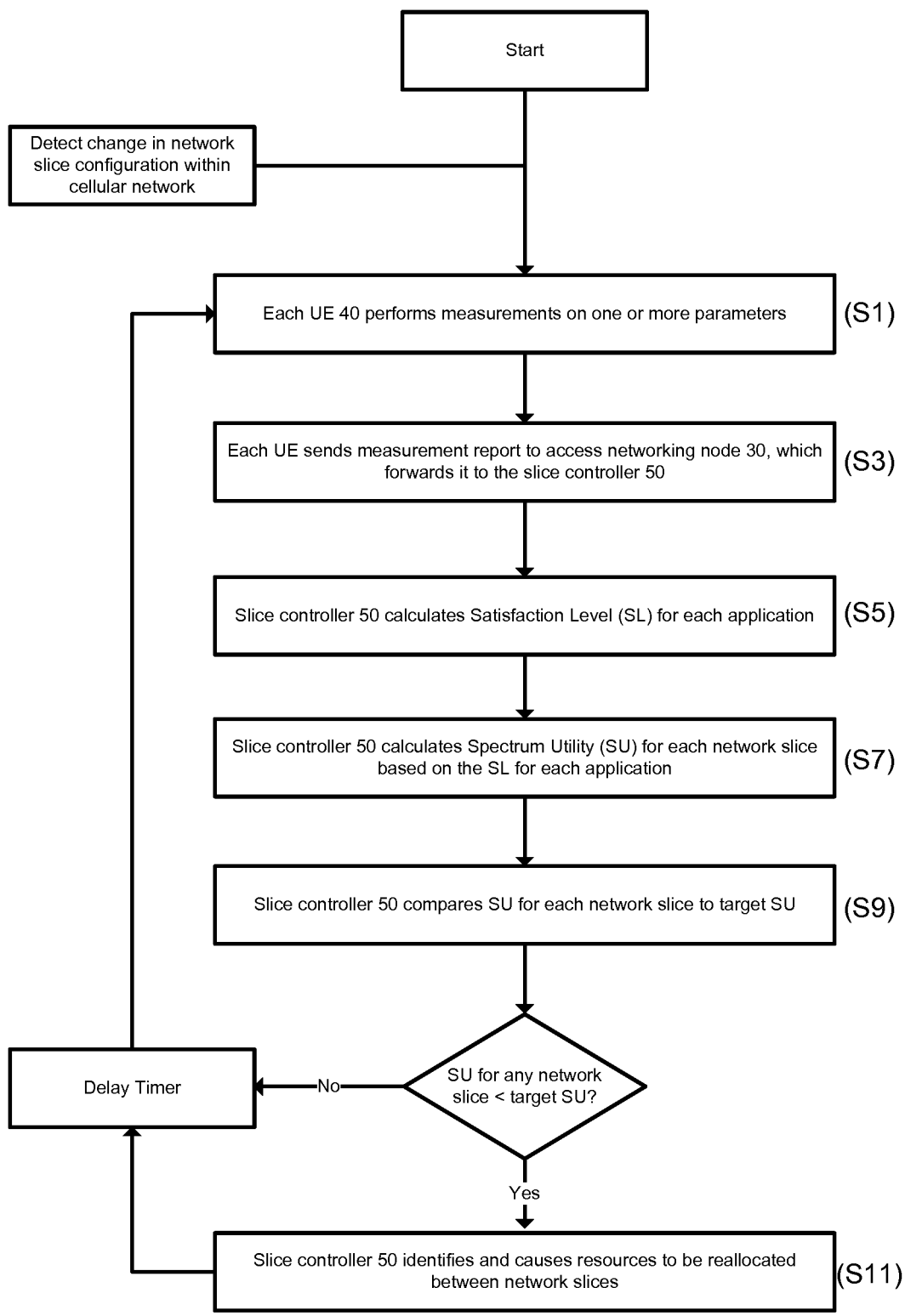
FIG. 5 is a flow diagram illustrating an embodiment of a method of the present disclosure.

By operating iteratively, the above process may apply as new applications and new network slices are dynamically added or removed from the cellular network 1. That is, at each iteration, the CPU 52 may evaluate the SL for each application (including any new applications that have been added to a particular network slice since the last iteration) and SU for each network slice (including any new network slices that have been added since the last iteration). This method may then be used to reallocate resources in a dynamic cellular network in which network slices are added/removed to the network and applications are added/removed to network slices. Furthermore, the method may also be triggered upon a request for a new application or network slice in the network such that resources may be reallocated immediately upon a change in the network slices for a network or, if the new request would render the SU for any single network slice as less than their respective threshold SU, then the request may be denied or only partially fulfilled. Thus, as shown in FIG. 5, S1 may be implemented periodically or upon a trigger condition being satisfied.

The skilled person will understand that it is non-essential that the method is practiced upon a network slice acting across multiple network nodes in the cellular network. That is, the benefits of the invention may be realized upon implementation in a single node (e.g. the access networking node alone).

Furthermore, the skilled person will understand that there are many ways in which the resources in the cellular network may be reallocated based on the comparisons of the spectrum utilizations for the different network slices to their respective target spectrum utilizations, and the above is just an example.

In the second function of the above embodiment, the satisfaction level is calculated for an application using a product of the satisfaction levels for each requirement. However, this is non-essential, and alternatively a summation may be used (for example, if the satisfaction level for each application does not depend jointly on the individual satisfaction levels for each requirement).

In the above embodiment, a cost factor is used as part of the SU calculation which is based on the cost of the resource usage in providing that service. The skilled person would understand that this cost may be multi-factor, in which each factor contributing to the cost of providing that service may be a sum or a product of those factors.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of allocating a resource in a virtualized radio access network, wherein the virtualized radio access network includes a first virtual machine delivering a first service type and a second virtual machine delivering a second service type different from the first service type, the method comprising:
receiving data indicating a performance measure of a first parameter for the first virtual machine and further indicating a performance measure of the first parameter for the second virtual machine;
determining a first spectrum utilization for the first virtual machine based on the performance measure of the first parameter for the first virtual machine relative to a performance requirement for the first parameter for the first service type;
determining a second spectrum utilization for the second virtual machine based on the performance measure of the first parameter for the second virtual machine relative to the performance requirement for the first parameter for the second service type;
comparing the first spectrum utilization to a target spectrum utilization for the first service type;
comparing the second spectrum utilization to a target spectrum utilization for the second service type; and
configuring a resource allocation for at least one of the first virtual machine and the second virtual machine based on the comparisons of the first spectrum utilization and the second spectrum utilization to the respective target spectrum utilizations.

2. The method as claimed in claim 1, wherein:
the data indicates a performance measure of a second parameter for the first virtual machine and further indicates a performance measure of the second parameter for the second virtual machine,
the first spectrum utilization for the first virtual machine is further based on the performance measure of the second parameter for the first virtual machine relative to a performance requirement for the second parameter for the first service type, and
the second spectrum utilization for the second virtual machine is further based on the performance measure of the second parameter for the second virtual machine relative to the performance requirement for the second parameter for the second service type.

3. The method as claimed in claim 1, wherein:
the first spectrum utilization for the first virtual machine is based on a product of (i) the performance measure of the first parameter for the first virtual machine relative to the performance requirement for the first parameter for the first service type, and (ii) the performance measure of the second parameter for the first virtual machine relative to the performance requirement for the second parameter for the first service type, and
the second spectrum utilization for the second virtual machine is based on a product of (i) the performance measure of the first parameter for the second virtual machine relative to the performance requirement for the first parameter for the second service type, and (ii) the performance measure of the second parameter for the second virtual machine relative to the performance requirement for the second parameter for the second service type.

4. The method as claimed in claim 2, wherein:
the performance measure of the first parameter is one of a set of performance measures of the first parameter, each relating to a user equipment (UE) of a plurality of UEs, and the performance measure of the second parameter is one of a set of performance measures of the second parameter, each relating to a UE of the plurality of UEs,
the first spectrum utilization for the first virtual machine is based on a sum of the product of (i) each performance measure of the first parameter for each UE for the first virtual machine relative to the performance requirement for the first parameter for the first service type, and (ii) each performance measure of the second parameter for each UE for the first virtual machine relative to the performance requirement for the second parameter for the first service type, and
the second spectrum utilization for the second virtual machine is based on a sum of the product of (i) each performance measure of the first parameter for each UE for the second virtual machine relative to the performance requirement for the first parameter for the second service type, and (ii) each performance measure of the second parameter for each UE for the second virtual machine relative to the performance requirement for the second parameter for the second service type.

5. The method as claimed in claim 4, wherein at least one of the first spectrum utilization or the second spectrum utilization are further based on one or more of the following: cost of serving the UE and coverage area.

6. The method as claimed in claim 1, wherein configuring the resource allocation includes one or more of the following: adjusting frame time, reallocating resource blocks, and reallocating processing resources.

7. The method as claimed in claim 1, wherein the first virtual machine is one of a plurality of first virtual machines, each being deployed on a respective networking node, for delivering the first service type, and the second virtual machine is one of a plurality of second virtual machines, each being deployed on a respective networking node, for delivering the second service type.

8. A computer system comprising:
at least one processor and memory configured to cause the computer system to allocate a resource in a virtualized radio access network, wherein the virtualized radio access network includes a first virtual machine delivering a first service type and a second virtual machine delivering a second service type different from the first service type, by:
receiving data indicating a performance measure of a first parameter for the first virtual machine and further indicating a performance measure of the first parameter for the second virtual machine;
determining a first spectrum utilization for the first virtual machine based on the performance measure of the first parameter for the first virtual machine relative to a performance requirement for the first parameter for the first service type;
determining a second spectrum utilization for the second virtual machine based on the performance measure of the first parameter for the second virtual machine relative to the performance requirement for the first parameter for the second service type;

comparing the first spectrum utilization to a target spectrum utilization for the first service type;

comparing the second spectrum utilization to a target spectrum utilization for the second service type; and configuring a resource allocation for at least one of the first virtual machine and the second virtual machine based on the comparisons of the first spectrum utilization and the second spectrum utilization to the respective target spectrum utilizations.

9. A non-transitory computer-readable storage having stored thereon computer program product comprising instructions which, when the computer program product is executed by a computer, cause the computer to carry out the method of claim 1.

10. A network node for a virtualized radio access network, wherein the virtualized radio access network includes a first virtual machine delivering a first service type and a second virtual machine delivering a second service type different from the first service type, the network node comprising:

a receiver adapted to receive data indicating a performance measure of a first parameter for the first virtual machine and further indicating a performance measure of the first parameter for the second virtual machine; and a processor adapted to:
determine a first spectrum utilization for the first virtual machine based on the performance measure of the first parameter for the first virtual machine relative to a performance requirement for the first parameter for the first service type;

determine a second spectrum utilization for the second virtual machine based on the performance measure of the first parameter for the second virtual machine relative to the performance requirement for the first parameter for the second service type;

compare the first spectrum utilization to a target spectrum utilization for the first service type;

compare the second spectrum utilization to a target spectrum utilization for the second service type; and configure a resource allocation for at least one of the first virtual machine and the second virtual machine based on the comparisons of the first spectrum utilization and the second spectrum utilization to the respective target spectrum utilizations.

11. The method as claimed in claim 1, wherein:
the first spectrum utilization is further based on a bandwidth used in delivering the first service type; and
the second spectrum utilization is further based on a bandwidth used in delivering the second service type.

\* \* \* \* \*